US012154471B2

(12) United States Patent
Choi et al.

(10) Patent No.: US 12,154,471 B2
(45) Date of Patent: Nov. 26, 2024

(54) SOURCE DRIVER CONTROLLING BIAS CURRENT

(71) Applicant: LX Semicon Co., Ltd., Daejeon (KR)

(72) Inventors: Jung Min Choi, Daejeon (KR); Hyung Sub Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/633,512

(22) PCT Filed: Aug. 7, 2020

(86) PCT No.: PCT/KR2020/010458
§ 371 (c)(1),
(2) Date: Feb. 7, 2022

(87) PCT Pub. No.: WO2021/029622
PCT Pub. Date: Feb. 18, 2021

(65) Prior Publication Data

US 2022/0351661 A1 Nov. 3, 2022

(30) Foreign Application Priority Data

Aug. 9, 2019 (KR) ........................ 10-2019-0097054
Nov. 19, 2019 (KR) ........................ 10-2019-0148190
Aug. 7, 2020 (KR) ........................ 10-2020-0098906

(51) Int. Cl.
*G09G 3/20* (2006.01)
*G09G 3/3233* (2016.01)

(52) U.S. Cl.
CPC ............ *G09G 3/20* (2013.01); *G09G 3/3233* (2013.01); *G09G 2310/027* (2013.01);
(Continued)

(58) Field of Classification Search
None
See application file for complete search history.

(56) References Cited

U.S. PATENT DOCUMENTS 8,085,234 B2 12/2011 Nishimura et al.
9,721,511 B2 8/2017 Jeong et al.
(Continued)

FOREIGN PATENT DOCUMENTS

CN 101127197 A 2/2008
CN 106200057 A 12/2016
(Continued)

OTHER PUBLICATIONS

PCT International Search Report, PCT/KR2020/010458, Oct. 30, 2020, 5 Pages.

*Primary Examiner* — Dorothy Harris
(74) *Attorney, Agent, or Firm* — ROTHWELL, FIGG, ERNST & MANBECK, P.C.

(57) ABSTRACT

The present disclosure, in an aspect, relates to a source driver to control a bias current, and more particularly, to a source driver, in which a bias current of a buffer is controlled depending on a distance between the source driver and a pixel in a data line and a position, regarding which a bias current is set, and the intensity of the bias current are changed in every frame so that unnecessary power consumption due to bias currents may be reduced and a block-dim phenomenon may be alleviated.

17 Claims, 11 Drawing Sheets

(52) U.S. Cl.
CPC ............... *G09G 2310/0275* (2013.01); *G09G 2310/0291* (2013.01); *G09G 2310/08* (2013.01); *G09G 2320/0223* (2013.01); *G09G 2330/021* (2013.01)

(56) References Cited

U.S. PATENT DOCUMENTS

| | | | | |
|---|---|---|---|---|
| 9,934,717 | B2 | 4/2018 | Zheng et al. | |
| 10,354,602 | B2 | 7/2019 | Hwang et al. | |
| 10,417,987 | B2 | 9/2019 | Xing et al. | |
| 10,614,749 | B2 | 4/2020 | Kim et al. | |
| 2004/0036670 | A1* | 2/2004 | Chung | G09G 3/3688 345/99 |
| 2015/0130851 | A1* | 5/2015 | Jeong | G09G 3/3688 345/82 |
| 2015/0279297 | A1* | 10/2015 | Nakano | G06F 3/0446 345/94 |
| 2016/0078841 | A1* | 3/2016 | Park | G09G 3/20 345/211 |
| 2016/0093270 | A1* | 3/2016 | Lee | G09G 3/3688 345/82 |
| 2018/0033381 | A1* | 2/2018 | Hwang | G09G 3/3677 |
| 2018/0158408 | A1* | 6/2018 | Chae | G09G 3/3233 |
| 2018/0286305 | A1* | 10/2018 | Kim | G09G 3/2074 |
| 2018/0308443 | A1* | 10/2018 | Yamagishi | G09G 3/3685 |
| 2018/0336860 | A1* | 11/2018 | Xing | G09G 3/3688 |
| 2018/0374447 | A1* | 12/2018 | Yun | G09G 3/00 |
| 2019/0295474 | A1* | 9/2019 | Kim | G09G 3/3648 |

FOREIGN PATENT DOCUMENTS

| | | | |
|---|---|---|---|
| CN | 108694902 | A | 10/2018 |
| CN | 110310605 | A | 10/2019 |
| JP | 2008268286 | A | 11/2008 |
| KR | 10-0880223 | B1 | 1/2009 |
| KR | 10-2012-0120517 | A | 11/2012 |
| KR | 10-2013-0027920 | A | 3/2013 |
| KR | 10-1378054 | B1 | 3/2014 |
| KR | 10-2018-0014406 | A | 2/2018 |
| KR | 10-2018-0110714 | A | 10/2018 |

* cited by examiner

Prior Art

Prior Art

SOURCE DRIVER CONTROLLING BIAS CURRENT

CROSS-REFERENCE TO RELATED APPLICATIONS

The present application is a 35 U.S.C. 371 Patent Application of PCT Application No. PCT/KR2020/010458 filed on Aug. 7, 2020 which claims priority under 35 U.S.C. 119(a) from Korean Patent Application No. 10-2019-0097054 filed on Aug. 9, 2019, Korean Patent Application No. 10-2019-0148190 filed on Nov. 19, 2019, and Korean Patent Application No. 10-2020-0098906 filed on Aug. 7, 2020 in the Korean Intellectual Property Office, each of which are hereby incorporated by reference in its entirety.

TECHNICAL FIELD

The present disclosure relates to a source driver to control a bias current and a display device comprising the same.

BACKGROUND ART

A display device may comprise a panel, a source driver to drive the panel, and a timing controller to control the drive of the source driver. The panel may comprise a plurality of pixels disposed to form a row in a horizontal direction and a column in a vertical direction. The plurality of pixels is disposed in the panel in a form of a matrix. The row formed by a plurality of pixels disposed in a horizontal direction may be referred to as a line.

The timing controller may transmit driving control data and image data to the source driver. The timing controller may control the driving timing of the source driver for the panel by the driving control data. The timing controller may transmit image data to the source driver.

The source driver may simultaneously drive a plurality of pixels in one line. The source driver may generate an image signal from image data in order to drive a plurality of pixels in the panel. The source driver may comprise a digital-analog converter (DAC) and a buffer. The DAC may convert image data into a data voltage, which is an analog signal. A buffer of a channel of the source driver may be connected with a plurality of data lines disposed in a vertical direction in the panel. The buffer may amplify a data voltage and output the data voltage to pixels through data lines of each channel.

A buffer may adjust a slew rate of a voltage outputted to a data line of a channel using a bias current. The buffer may receive a bias current having a high intensity and adjust the slew rate to be high. Otherwise, the buffer may receive a bias current having a low intensity and adjust the slew rate to be low.

Conventionally, bias currents having a uniform intensity regardless of the positions of pixels on a data line have been supplied to a buffer. That is, conventionally, a buffer outputted data voltages using bias currents having a same intensity for both a pixel adjacent to a source driver and a pixel distanced from the source driver on a data line. However, it is unnecessary to use a bias current, having a high intensity for driving a distanced pixel, in order to drive an adjacent pixel. If a bias current of a high intensity is used for driving an adjacent pixel, excessive power consumption may occur in a buffer. In addition, the power consumption of a buffer occupies most part of the entire power consumption of the source driver. For this reason, it is required to adjust a bias current differently depending on the position of a pixel on a data line in order to reduce the power consumption of the source driver.

DETAILED DESCRIPTION OF THE INVENTION

Technical Problem

In this background, an aspect of the present disclosure is to provide a technique for differentiating the intensity of a bias current of a buffer depending on a distance on a data line between a source driver and a pixel.

Another aspect of the present disclosure is to provide a technique for adjusting a bias current in a buffer so that a data voltage for each pixel on a data line is saturated in a predetermined time.

Still another aspect of the present disclosure is to provide a technique for setting a bias current for a pixel at a different position in every frame.

Technical Solution

To this end, in an aspect, the present disclosure provides a source driver comprising: a buffer to output a plurality of data voltages using bias currents in order to drive a plurality of pixels connected to a data line; and a bias control circuit to adjust the intensities of the bias currents according to the positions of respective pixels connected to the data line, wherein the bias control circuit differently determines a pixel position regarding which the intensity of a bias current is adjusted in every frame and differently determines the intensity of the bias current to be adjusted for a pixel of the pixel position in every frame.

In the source driver, the bias control circuit may receive a bias control signal including position data of a pixel regarding which the intensity of a bias current is adjusted and timing data prescribing a timing when the intensity of the bias current is adjusted.

In the source driver, the bias control signal may include intensity data of the bias current to be adjusted.

In the source driver, the bias control signal may be generated and transmitted by the timing controller.

In the source driver, the bias control circuit may adjust bias currents to have a first intensity for a first group of pixels among the plurality of pixels and adjust bias currents to have a second intensity for a second group of pixels among the plurality of pixels in each channel.

In the source driver, the second group of pixels may be more distanced than the first group of pixels in the data line and the bias control circuit may adjust the second intensity to be higher than the first intensity.

In the source driver, the second group of pixels may comprise a boundary pixel for which the intensity of a bias current is changed to the second intensity and the bias control circuit may determine the boundary pixel randomly or according to a predetermined rule, adjust the intensity of the bias current for a boundary pixel to be the second intensity in a first frame, and adjust the intensity of the bias current for the boundary pixel to be the third intensity different from the second intensity in a second frame.

In the source driver, a difference between a time during which data voltages for the first group of pixels are formed and a time during which data voltages for the second group of pixels are formed may be within a predetermined range.

In the source driver, a different pixel may be determined as a boundary pixel in every frame and boundary pixels respectively in adjacent channels may be positioned in different lines.

In the source driver, the bias control circuit may adjust a bias current to have a highest intensity for driving a pixel most distanced from the source driver and adjust a bias current to have a lowest intensity for driving a pixel positioned nearest to the source driver.

In the source driver, a difference between a time during which a data voltage for the pixel most distanced from the source driver is formed and a time during which a data voltage for the pixel positioned nearest to the source driver is formed may be within a predetermined range.

In the source driver, the bias control circuit may divide the plurality of pixels into a plurality of groups and adjust the intensity of bias currents to be different for respective groups. The bias control circuit may adjust bias currents to have a highest intensity for driving a group of pixels most distanced from the source driver and adjust bias current to have a lowest intensity for driving a group of pixels positioned nearest to the source driver.

In the source driver, a difference between a time during which data voltages for the group most distanced from the source driver are formed and a time during which data voltages for the group positioned nearest to the source driver are formed may be within a predetermined range.

In another aspect, the present disclosure provides a source driver comprising: a buffer to output an M (M is a natural number equal to or greater than 1) data voltage for an Mth pixel connected to a data line using an M bias current, to output an N (N is a natural number equal to or greater than M+1) data voltage for an Nth pixel connected to the data line using an N bias current having an intensity higher than that of the M bias current, to consume M power required for the M bias current, and to consume N power required for the N bias current and greater than the M power; and a bias control circuit to generate the M bias current and the N bias current and to supply them to the buffer, wherein the bias control circuit determines different pixels to be the Mth pixel and the Nth pixel in every frame and determines the M bias current and the N bias current to be different in every frame.

In the source driver, the buffer may operate in a first mode in which the buffer outputs the M data voltage using the M bias current and outputs the N data voltage using the N bias current or in a second mode in which the buffer outputs the M data voltage and the M+1 data voltage using bias currents having a same intensity.

In the source driver, the bias control circuit may generate the M bias current for an M group of pixels including the Mth pixel and generate the N bias current for an N group of pixels including the Nth pixel.

Effects of the Invention

As described above, according to the present disclosure, it is possible to reduce the power consumption of the entire display device by minimizing unnecessary power consumption by bias currents.

In addition, the present disclosure allows a dynamic and adaptive control of a bias current depending on the positions of pixels on a data line of a channel.

In addition, the present disclosure allows a more efficient and simple control of a bias current.

Further, the present disclosure allows alleviating a block dim phenomenon.

MODE FOR IMPLEMENTING THE INVENTION

Figure 1:
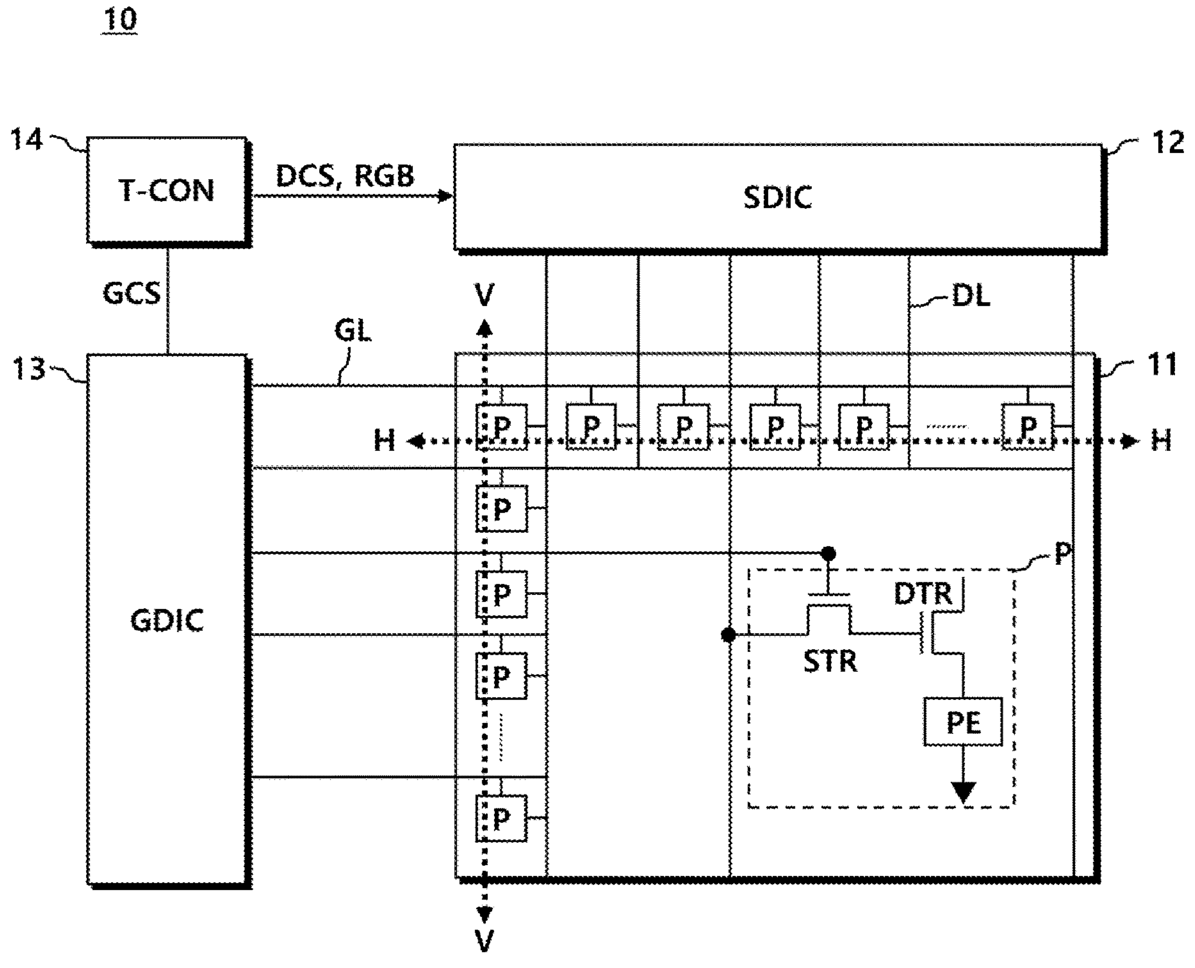
FIG. 1 is a configuration diagram of a display device according to an embodiment.

Hereinafter, some embodiments of the present disclosure will be described in detail with reference to the accompanying drawings. With regard to the reference numerals of the components of the respective drawings, it should be noted that the same reference numerals are assigned to the same components even though they are shown in different drawings. In addition, in describing the present disclosure, a detailed description of a well-known configuration or function related the present disclosure, which may obscure the subject matter of the present disclosure, will be omitted.

In addition, terms, such as “1st”, “2nd”, “A”, “B”, “(a)”, “(b)”, or the like, may be used in describing the components of the present disclosure. These terms are intended only for distinguishing a corresponding component from other components, and the nature, order, or sequence of the corresponding component is not limited to the terms. In the case where a component is described as being “coupled”, “combined”, or “connected” to another component, it should be understood that the corresponding component may be directly coupled or connected to another component or that the corresponding component may also be “coupled”, “combined”, or “connected” to the component via another component provided therebetween.

FIG. 1 is a configuration diagram of a display device according to an embodiment.

Referring to FIG. 1, a display device 10 may comprise a panel 11, a source driver 12, a gate driver 13, and a timing controller 14.

In the panel 11, a plurality of data lines DL and a plurality of gate lines GL may be disposed and a plurality of pixels P may also be disposed. The plurality of pixels P may be disposed to be close to each other in a horizontal direction H and in a vertical direction V to form a square. The square form is similar to a form of a matrix. A group or a horizontal line formed by a plurality of pixels P disposed in the horizontal direction H may be defined as a row or a line and a group or a vertical line formed by a plurality of pixels P disposed in the vertical direction V may be as a column.

The gate driver 13 may supply a scan signal of a turn-on voltage or a turn-off voltage to a gate line GL. When a scan signal of a turn-on voltage is suppled to a pixel P, the pixel P may be connected with a data line DL. When a scan signal of a turn-off voltage is supplied to the pixel P, the pixel P may be disconnected from the data line DL.

For example, when a scan transistor STR of a pixel P is turned on by a scan signal of a turn-on voltage, a pixel electrode PE may be connected with a data line. When the scan transistor STR of the pixel P is turned off by a scan signal of a turn-off voltage, the pixel electrode PE may be disconnected from the data line.

The source driver 12 supplies a data voltage to a data line DL. The data voltage supplied to the data line DL may be transmitted to a driving transistor of a pixel P connected with the data line DL by a scan signal. As driving transistors DTR of a plurality of pixels P connected with one data line DL are sequentially turned on by a scan signal of a turn-on voltage, the source driver 12 may sequentially output data voltages to the driving transistor DTR of the plurality of pixels P.

The timing controller 14 may supply various control signals to the gate driver 13 and the source driver 12. The timing controller 14 may generate a gate control signal GCS to initiate a scan according to a timing for each frame and transmit the same to the gate driver 13. In addition, the timing controller 14 may receive image data from an external device and output image data RGB, converted into one in a form of data used in the source driver 12, to the source driver 12. Further, the timing controller 14 may transmit a data control signal DCS to control the source driver 12 to supply a data voltage to each pixel P at an appropriate timing.

Figure 2:
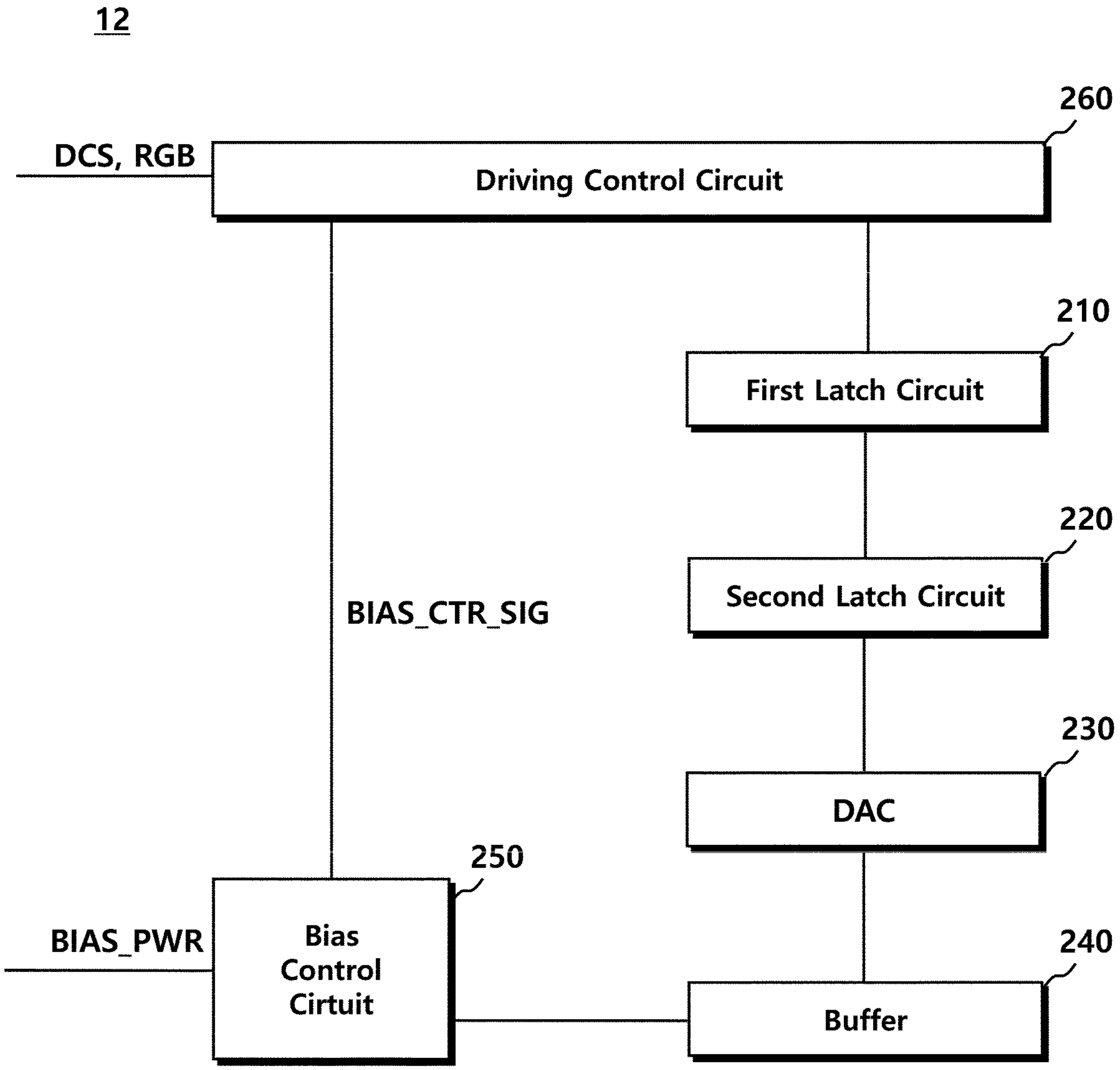
FIG. 2 is a configuration diagram of a source driver according to an embodiment.

FIG. 2 is a configuration diagram of a source driver according to an embodiment.

Referring to FIG. 2, the source driver 12 may comprise a first latch circuit 210, a second latch circuit 220, a digital-analog converter (DAC) 230, a buffer 240, a bias control circuit 250, and a driving control circuit 260.

The first latch circuit 210 may latch image data RGB. The first latch circuit 210 may temporarily store image data RGB and output the same to the second latch circuit 220. The first latch circuit 210 may temporarily store the image data RGB and output the same to the second latch circuit 220 according to a clock of a shift register (not shown).

The second latch circuit 220 may latch image data RGB. The second latch circuit 220 may temporarily store image data RGB and output the same to the DAC 230. The second latch circuit 220 may temporarily store the image data RGB and output the same to the DAC 230 according to a clock of a shift register (not shown).

The DAC 230 may receive the image data RGB from the second latch circuit 220. The DAC 230 may generate a data voltage, which is an analog signal, from the image data RGB. The DAC 230 may select a grayscale voltage corresponding to the image data RGB transmitted from the second latch circuit 220 among a predetermined number of grayscale voltages generated from a gamma reference voltage inputted from an external device and output the same to the buffer 240.

The buffer 240 may receive a data voltage from the DAC 230. The buffer 240 may amplify the data voltage and supply the same to a data line.

The buffer 240 may receive a bias current from a bias control circuit 250 and output a data voltage. The buffer 240 may output a data voltage according to a bias current. The buffer 240 may adjust slew rates of the data voltages by a bias current.

The bias control circuit 250 may generate a bias current and supply the bias current to the buffer 240. For example, the bias control circuit 250 may receive bias power BIAS_PWR from an external device. The bias power BIAS_PWR may comprise a plurality of bias currents. The bias control circuit 250 may receive a bias control signal BIAS_CTR_SIG from the driving control circuit 260. The bias control circuit 250 may select one of a plurality of bias currents comprised in the bias power BIAS_PWR using the bias control signal BIAS_CTR_SIG and output a selected bias current to the buffer 240. Otherwise, the bias control circuit 250 may generate a bias current by adjusting the current amount comprised in the bias power BIAS_PWR using the bias control signal BIAS_CTR_SIG. Otherwise, the bias control circuit 250 may generate a bias current by increasing or decreasing the current amount comprised in the bias power BIAS_PWR.

In addition, the bias control circuit 250 may differentially adjust bias currents depending the positions of a plurality of pixels connected with one data line. The bias control circuit 250 may differentiate bias currents for respective pixels depending on how distanced from the source driver 12 the pixels are. For example, the bias control circuit 250 may adjust a bias current to have a low intensity in order to drive a pixel adjacent to the source driver 12. Otherwise, the bias control circuit 250 may adjust a bias current to have a high intensity in order to drive a pixel distanced from the source driver 12.

The bias control circuit 250 may determine whether or not to adjust a bias current from the bias control signal BIAS_CTR_SIG. Otherwise, the bias control circuit 250 may determine the position of a pixel regarding which a bias current is adjusted from the bias control signal BIAS_CTR_SIG. Otherwise, the bias control circuit 250 may determine how high or low intensity a bias current will have from the bias control signal BIA_CTR_SIG. Otherwise, the bias control circuit 250 may determine a pixel (boundary pixel) for which the setting of a bias current is changed in every frame and adjust the bias current according to this determination based on the bias control signal BIAS_CTR_SIG.

The driving control circuit 260 may receive image data RGB from the timing controller. The driving control circuit 260 may transmit the image data RGB to the first latch circuit 210. The image data RGB may be outputted via the second latch circuit 220 and the DAC 230 to a pixel connected to a data line by the buffer 240.

The driving control circuit 260 may receive a data control signal DCS from the timing controller. The driving control circuit 260 may generate a clock from the data control signal DCS and provide the clock so as to drive the first latch circuit 210, the second latch circuit 220, the DAC 230, and the buffer 240.

The driving control circuit 260 may generate a bias control signal BIAS_CTR_SIG from the data control signal DCS. The bias control signal BIAS_CTR_SIG may determine whether or not to adjust a bias current. For example, the bias control circuit 250 may operate in a first mode in which bias currents are differentially adjusted and supplied to the buffer 240 and a second mode in which bias currents are not adjusted and the bias currents having a same intensity are supplied to the buffer 240. The bias control signal BIAS_CTR_SIG may comprise information to take one of the first mode and the second mode. Otherwise, the bias control signal BIAS_CTR_SIG may comprise information of the adjustment of bias currents for a plurality of pixels connected to one data line. For example, the bias control signal BIAS_CTR_SIG may comprise information of the position of a pixel requiring an adjusted bias current. Otherwise, the bias control signal BIAS_CTR_SIG may comprise information of a current value varying whenever driving each pixel. The bias control signal BIAS_CTR_SIG may comprise information of the position of a pixel (boundary pixel) for which the setting of a bias current is changed in every frame.

The driving control circuit 260 may determine the position of a pixel requiring the adjustment of a bias current.

For example, the driving control circuit 260 may receive position data of the pixel from the timing controller and determine the pixel for which the adjustment of a bias current is required. The position data may be transmitted from the timing controller to the driving control circuit 260 in a state of being comprised in a data control signal DCS. The driving control circuit 260 may determine a pixel for which the adjustment of a bias current is required based on the position data. The driving control circuit 260 may include the position data of the pixel in a bias control signal BIAS_CTR_SIG and transmit the signal to the bias control circuit 250. The bias control circuit 250 may adjust a bias current for a pixel determined based on the position data and supply the bias current to the buffer 240.

For another example, the driving control circuit 260 may generate a timing to determine a pixel for which the adjustment of a bias current is required. The driving control circuit 260 may measure the scan time for pixels of one line and determine the position of a pixel requiring the adjustment of a bias current according to the lapse of the scan time. If the scan time for pixels of each line is $t_1$, the driving control circuit 260 may generate a timing for a first pixel positioned in a first line of the panel at the moment when a frame begins and include the timing in a bias control signal BIAS_CTR_SIG to transmit the timing to the bias control circuit 250. The bias control circuit 250 may adjust a bias current for the first pixel and supply the bias current to the buffer 240. Subsequently, the driving control circuit 260 may generate a timing for a second pixel positioned in a second line of the panel after the lapse of $t_1$ and transmit the timing to the bias control circuit 250. The bias control circuit 250 may adjust a bias current for the second pixel and supply the bias current to the buffer 240. Subsequently, the driving control circuit 260 may generate a timing for a third pixel positioned in a third line of the panel after the lapse of $2t_1$ and transmit the timing to the bias control circuit 250. The bias control circuit 250 may adjust a bias current for the third pixel and supply the bias current to the buffer 240.

The buffer 240 may output a data voltage based on an adjusted bias current. For example, the buffer 240 may receive a first bias current and output a first data voltage corresponding to first image data based on the first bias current to a pixel of the first line. The buffer may receive a second bias current and output a second data voltage corresponding to second image data based on the second bias current to a pixel of the second line. Here, the second bias current may be adjusted to have an intensity higher than that of the first bias current.

Preferably, the buffer 240 may use bias currents differentially adjusted depending on the positions of a plurality of pixels connected to one data line. The buffer 240 may receive the differentially adjusted bias currents and output different data voltages based on the bias currents. The buffer 240 may output different data voltages depending on how distanced from the source driver 12 a pixel is. For example, the buffer may output a first data voltage to a pixel near to the source driver 12 using a bias current adjusted to have a low intensity. Otherwise, the buffer 240 may output a second data voltage to a pixel far from the source driver 12 using a bias current adjusted to have a high intensity.

Figure 3:
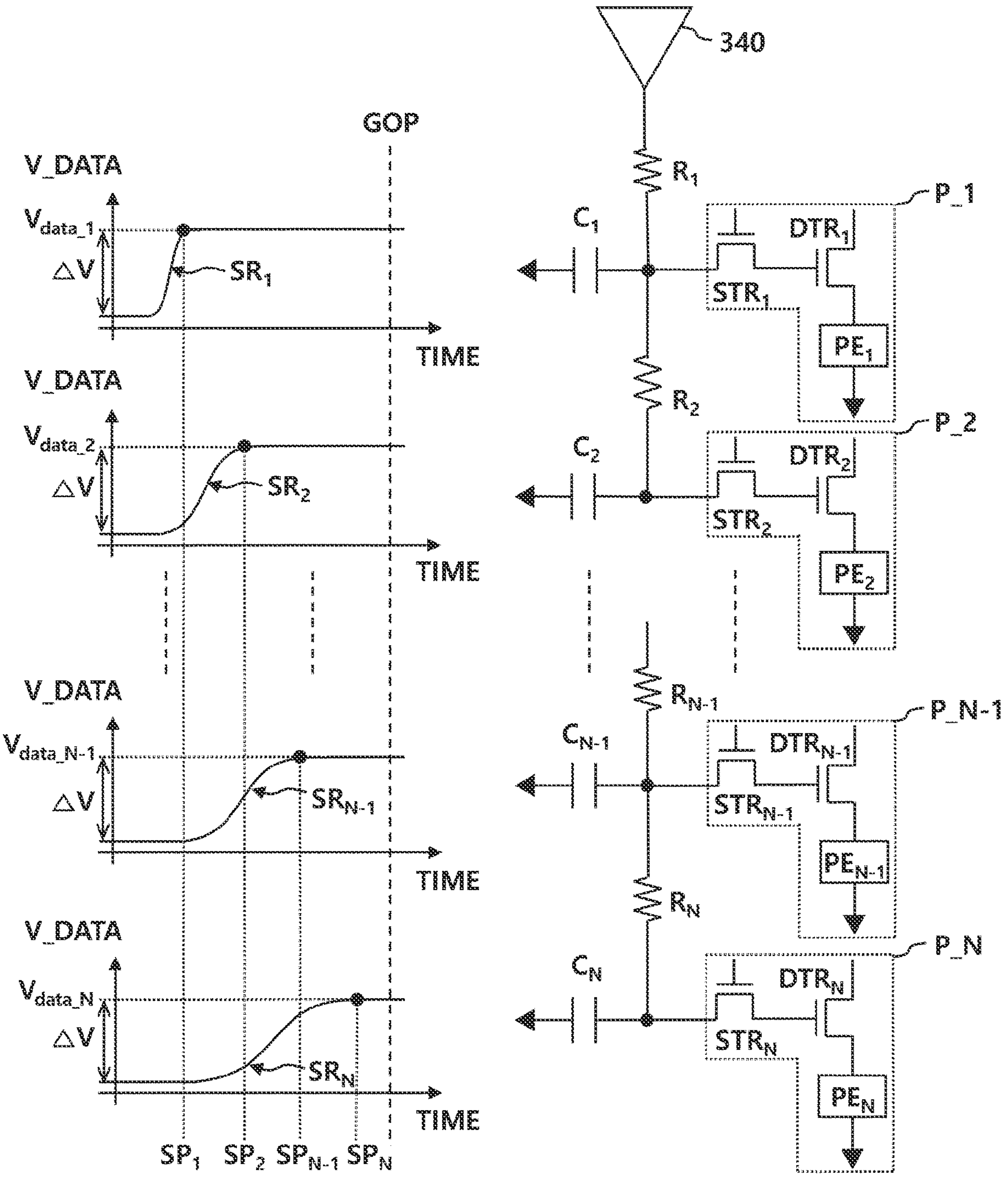
FIG. 3 is a diagram illustrating over time slew rates of voltages applied to a plurality of pixels connected with one data line.

FIG. 3 is a diagram illustrating over time slew rates of voltages applied to a plurality of pixels connected with one data line.

FIG. 3 illustrates a plurality of pixels connected to one data line and slew rates corresponding to respective pixels. According to conventional arts, a buffer 340 may use bias currents having a same intensity regardless of the positions of the pixels connected to one data line to output data voltages corresponding to respective pixels. Therefore, the buffer 340 may output data voltages to a pixel near to the source driver and to a pixel far from the source driver using the bias currents having a same intensity.

For example, the buffer 340 may output data voltages to a plurality of pixels P_1, P_2, . . . , P_N−1, P_N connected to one data line using the bias currents having a same intensity.

Here, each of a plurality of pixels P_1, P_2, . . . , P_N−1, P_N may comprise a scan transistor $STR_1$, $STR_2$, . . . , $STR_{N-1}$, $STR_N$, a driving transistor $DTR_1$, $DTR_2$, . . . , $DTR_{N-1}$, $DTR_N$, and a pixel electrode $PE_1$, $PE_2$, . . . , $PE_{N-1}$, $PE_N$. In one data line, there may exist resistance elements and capacitance elements. The resistance elements may be generated in the data line when the data voltages are applied to the respective pixels. The capacitance elements may be generated by the coupling between the data line and another line adjacent to the data line or an electrode. The resistance elements may be referred to as resistances $R_1$, $R_2$, . . . , $R_{N-1}$, $R_N$ respectively corresponding to a plurality of pixels P_1, P_2, . . . , P_N−1, P_N. The capacitance elements may be referred to as capacitors $C_1$, $C_2$, . . . , $C_{N-1}$, $C_N$ respectively corresponding to a plurality of pixels P_1, P_2, . . . , P_N−1, P_N.

When the buffer 340 outputs data voltages to the plurality of pixels P_1, P_2, . . . , P_N−1, P_N using the bias currents having a same intensity, slew rates of the data voltages applied for the respective pixels to a data line may differ from each other depending on the distances from the buffer 340 to the respective pixels. In FIG. 3, the slew rates are illustrated as graphs, each having an axis of time (TIME) and an axis of data voltage (V_DATA).

Supposing that all the data voltage for the plurality of pixels P_1, P_2, . . . , P_N−1, P_N are obtained by a same input data voltage being changed by a same variance ΔV, when the buffer 340 outputs a data voltage for each pixel, the data voltage may be outputted from a time point when the pixel is connected to a data line by a scan signal of turn-on voltage to a time point when the pixel is disconnected from the data line by a scan signal of turn-off voltage (gate-off point GOP).

When the buffer 340 outputs a first data voltage $V_{data\_1}$ for driving a first pixel P_1, an input data voltage may be changed by ΔV to reach the first data voltage $V_{data\_1}$ and have a first slew rate $SR_1$. A time point when the input data voltage reaches the first data voltage $V_{data\_1}$ may be referred to as a first saturation point $SP_1$. The first saturation point $SP_1$ may mean a time elapsing from a time point when the first pixel P_1 is connected to a data line by a scan signal of the gate driver to a time point when the input data voltage reaches to the first data voltage $V_{data\_1}$.

When the buffer 340 outputs a second data voltage $V_{data\_2}$ for driving a second pixel P_2, an input data voltage may be changed by ΔV to reach the second data voltage $V_{data\_2}$ and have a second slew rate $SR_2$. A time point when the input data voltage reaches the second data voltage $V_{data\_2}$ may be referred to as a second saturation point $SP_2$. The second saturation point $SP_2$ may mean a time elapsing from a time point when the second pixel P_2 is connected to a data line by a scan signal of the gate driver to a time point when the input data voltage reaches to the second data voltage $V_{data\_2}$.

When the buffer 340 outputs an N−1th data voltage $V_{data\_N-1}$ for driving an N−1th pixel P_N−1, an input data voltage may be changed by ΔV to reach the N−1th data voltage $V_{data\_N-1}$ and have an N−1th slew rate $SR_{N-1}$. A time point when the input data voltage reaches the N−1th data voltage $V_{data\_N-1}$ may be referred to as an N−1th saturation point $SP_{N-1}$. The N−1th saturation point $SP_{N-1}$ may mean a time elapsing from a time point when the N−1th pixel P_N−1 is connected to a data line by a scan signal of the gate driver to a time point when the input data voltage reaches to the N−1th data voltage $V_{data\_N-1}$.

When the buffer 340 outputs an Nth data voltage $V_{data\_N}$ for driving an Nth pixel P_N, an input data voltage may be changed by ΔV to reach the Nth data voltage $V_{data\_N}$ and have an Nth slew rate $SR_N$. A time point when the input data voltage reaches the Nth data voltage Vaasa N may be referred to as an Nth saturation point $SP_N$. The Nth saturation point $SP_N$ may mean a time elapsing from a time point when the Nth pixel P_N is connected to a data line by a scan signal of the gate driver to a time point when the input data voltage reaches to the Nth data voltage $V_{data\_N}$.

Since the buffer 340 outputs data voltages to the plurality of pixel P_1, P_2, . . . , P_N−1, P_N using the bias currents having a same intensity, the first through the Nth slew rates $SR_1$, $SR_2$, . . . , $SR_{N-1}$, $SR_N$ may be different. For example, the first slew rate $SR_1$ may be high and the second slew rate $SR_2$ may be lower than the first slew rate $SR_1$. The first data voltage $V_{data\_1}$ supplied to the first pixel P_1 may have a delay relatively shorter than that of the second data voltage $V_{data\_2}$. A delay may occur due to the resistance elements and the capacitance elements. The longer a delay is, the lower a slew rate becomes and the shorter a delay is, the higher a slew rate becomes. The first data voltage $V_{data\_1}$ may pass through one resistance $R_1$ and one capacitor $C_1$, but the second data voltage $V_{data\_2}$ may pass through two resistances $R_1$, $R_2$ and two capacitors $C_1$, $C_2$. For this reason, a delay regarding the first data voltage $V_{data\_1}$ may shorter than a delay regarding the second data voltage $V_{data\_2}$, and accordingly, the first slew rate $SR_1$ may be higher than the second slew rate $SR_2$. Due to the difference between the slew rates, the first saturation point $SP_1$ may be shorter than the second saturation point $SP_2$.

For the same reason, the N−1th slew rate $SR_{N-1}$ may be higher than the Nth slew rate $SR_N$. When comparing all the slew rates of the plurality of pixels P_1, P_2, . . . , P_N−1, P_N, the first slew rate $SR_1$ may be the highest and the Nth slew rate $SR_N$ may be the lowest. Due to the delays by the resistance elements and the capacitance elements, as a pixel is nearer to the source driver, that is, the buffer 340, the relevant slew rate may be higher and as a pixel is more distanced from the buffer 340, the relevant slew rate may be lower. Due to the differences of the slew rates, as a pixel is nearer to the buffer 340, the relevant saturation point may be shorter and, as a pixel is more distanced from the buffer 340, the relevant saturation point may be longer.

Meanwhile, when the buffer 340 drives the plurality of pixels P_1, P_2, . . . , P_N−1, P_N using bias currents having a same intensity, the respective data voltages may reach required levels within gate-off points GOP. However, generating all the data voltages using bias currents having a same intensity may unnecessarily increase the power consumption due to the bias currents.

For example, since the first data voltage $V_{data\_1}$ for the first pixel P_1 may be reached within a predetermined time, the buffer 340 may use a bias current having a low intensity to output the first data voltage $V_{data\_1}$. However, since the Nth data voltage $V_{data\_N}$ for the Nth pixel P_N may not be reached within a predetermined time, the buffer 340 needs to use a bias current having a high intensity. The reason is that the delay becomes longer as a pixel is distanced from the buffer 340 due to the resistance elements and the capacitance elements. For this reason, using bias currents having a same intensity for driving both a pixel near to the buffer 340 as the first pixel P_1 and a pixel far from the buffer 340 as the Nth pixel P_N may unnecessarily increase the power consumed by the buffer 340. If a bias current having a low intensity is used for a pixel near to the buffer 340 and a bias current having a high intensity is used for a pixel far from the buffer 340, the power consumption in the buffer 340 due to the bias currents may considerably be reduced.

Figure 4:
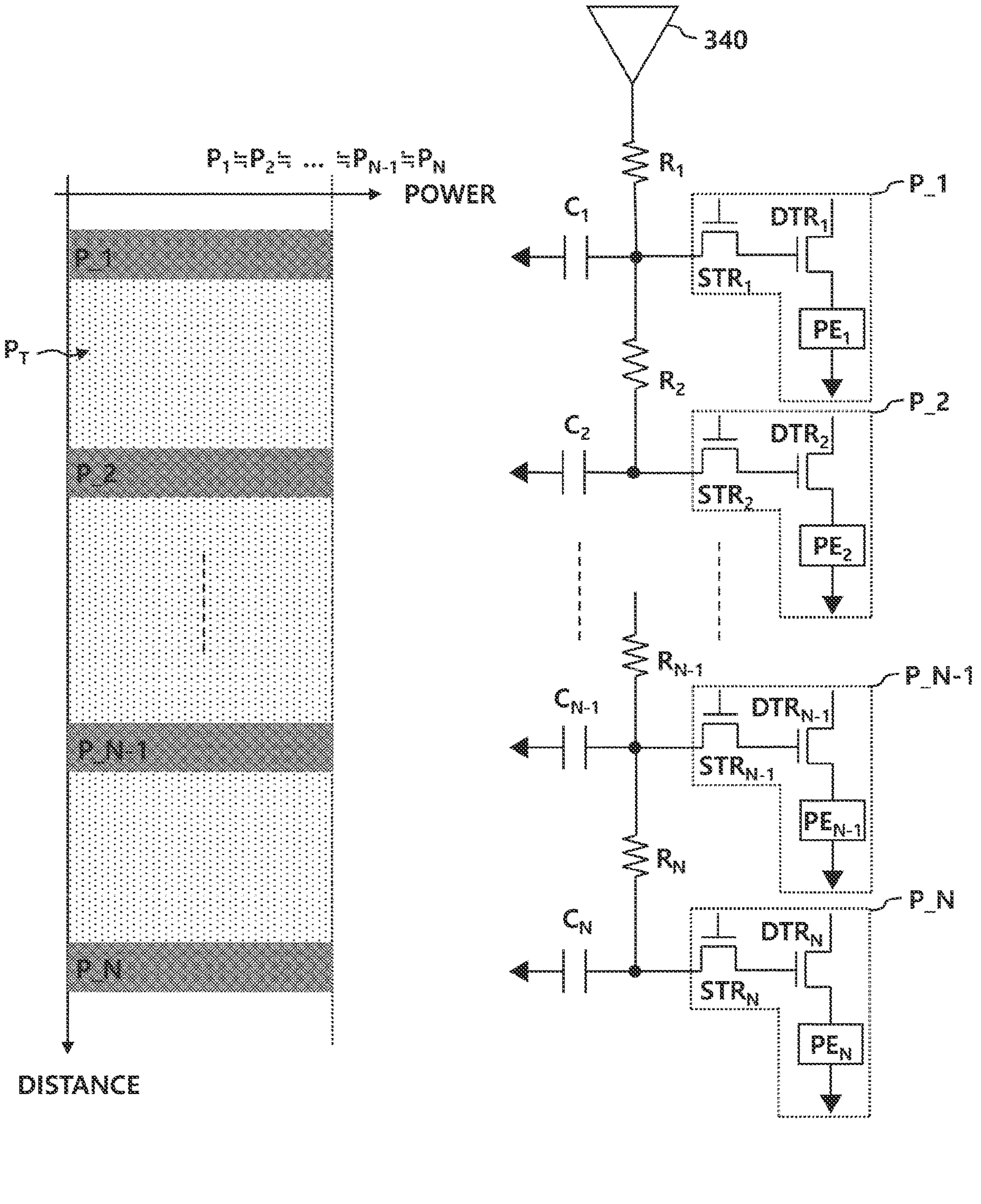
FIG. 4 is a diagram illustrating power consumed by bias current in a plurality of pixels connected with one data line.

FIG. 4 is a diagram illustrating power consumed by bias current in a plurality of pixels connected with one data line.

FIG. 4 illustrates a plurality of pixels connected to one data line and power consumed due to a bias current for each pixel. Conventionally, the buffer 340 may output data voltages corresponding to respective pixels using bias currents having a same intensity regardless of the positions of the respective pixels in the data line. Therefore, the buffer 340 may consume the same power both when driving a pixel near to the source driver and when driving a pixel far from the source driver.

For example, power, that the buffer consumes for the bias currents in order to drive the plurality of pixels P_1, P_2, . . . , P_N−1, P_N, may be the same regardless of the positions of the pixels. In other words, first power $P_1$ consumed by the buffer 340 regarding a bias current for driving the first pixel P_1, second power $P_2$ consumed by the buffer 340 regarding a bias current for driving the second pixel P_2, N−1th power $P_{N-1}$ consumed by the buffer 340 regarding a bias current for driving the N−1th pixel P_N−1, and Nth power $P_N$ consumed by the buffer 340 regarding a bias current for driving the Nth pixel P_N may be identical.

Total power $P_T$ consumed in one data line by the buffer 340 for the bias currents may be identical to a sum of the first power to the Nth power $P_1$, $P_2$, . . . , $P_{N-1}$, $P_N$. In FIG. 4, the total power $P_T$ and the first power to the Nth power $P_1$, $P_2$, $P_{N-1}$, $P_N$ are illustrated as graphs having an axis of the power (POWER) and an axis of distances from the buffer 340 (DISTANCE).

Figure 5:
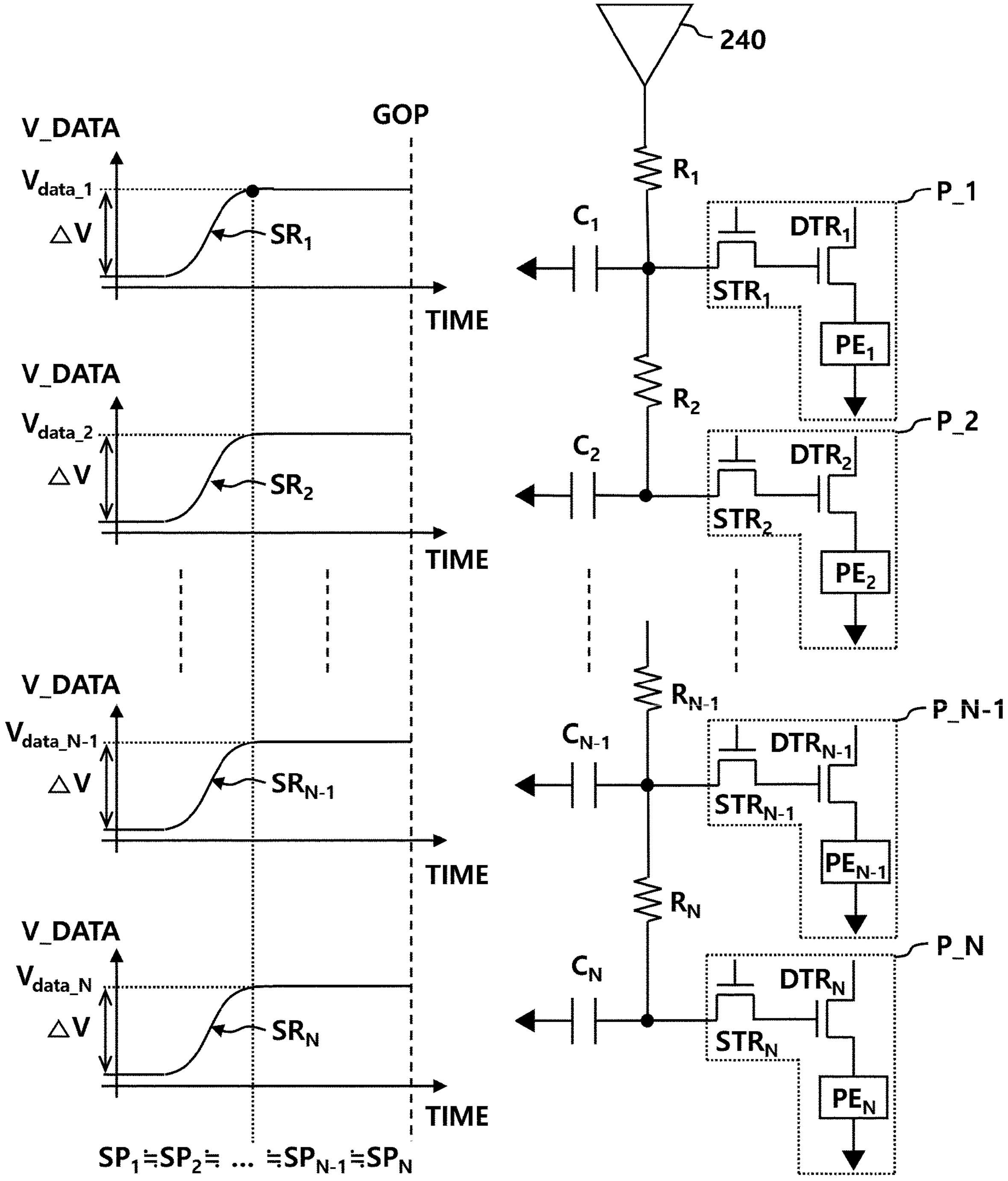
FIG. 5 is a diagram illustrating over time slew rates of voltages applied to a plurality of pixels connected with one data line according to an embodiment.

FIG. 5 is a diagram illustrating over time slew rates of voltages applied to a plurality of pixels connected with one data line according to an embodiment.

FIG. 5 illustrates a plurality of pixels connected to one data line and slew rates corresponding to respective pixels according to an embodiment. According to an embodiment, a buffer 240 may output data voltages corresponding to the respective pixels using bias currents having different intensities depending on the positions of the pixels. That is, the buffer 240 may output a data voltage to a pixel near to the source driver using a bias current having a low intensity and output a data voltage to a pixel far from the source driver using a bias current having a high intensity.

For example, the buffer 240 may output data voltages to the plurality of pixels P_1, P_2, . . . , P_N−1, P_N connected to one data line using different bias current. Specifically, the buffer 240 may output data voltages using the bias currents having intensities increasing as the outputs of the data voltages progresses regarding from the first pixel P_1 to the Nth pixel P_N.

When the buffer 240 outputs data voltages to the plurality of pixels P_1, P_2, . . . , P_N−1, P_N using different bias currents, the slew rates of the data voltages corresponding to the respective pixels may be similar to each other regardless of the distances between the buffer 240 and the respective pixels. The similarity may mean that, even though the slew rates are not identical, the differences between the slew rates are within a certain range, wherein the range may be predetermined.

For example, in a case when the buffer 240 sequentially outputs the data voltages to the respective pixels under the same condition as that of FIG. 3, a data voltage may be outputted from a time point when a pixel is connected to a data line by a scan signal of a turn-on voltage from the gate driver to a time point when the pixel is disconnected from the data line by a scan signal of a turn-off voltage (a gate-off point (GOP)).

When the buffer 240 outputs a first data voltage $V_{data\_1}$ using a first bias current in order to drive a first pixel P_1, an input data voltage may be changed by ΔV to reach the first data voltage $V_{data\_1}$ and have a first slew rate $SR_1$.

Subsequently, when the buffer 240 outputs a second data voltage $V_{data\_2}$ using a second bias current in order to drive a second pixel P_2, an input data voltage may be changed by ΔV to reach the second data voltage $V_{data\_2}$ and have a second slew rate $SR_2$. The second bias current may have an intensity higher than that of the first bias current.

Subsequently, when the buffer 240 outputs an N−1th data voltage $V_{data\_N-1}$ using an N−1th bias current in order to drive an N−1th pixel P_N−1, an input data voltage may be changed by A V to reach the N−1th data voltage $V_{data\_N-1}$ and have an N−1th slew rate $SR_{N-1}$. The N−1th bias current may have an intensity higher than that of the second bias current. Preferably, the N−1th bias current may have an intensity higher than that of an N−2th bias current for an N−2th pixel driven previously to the N−1th pixel P_N−1.

At the end, when the buffer 240 outputs an Nth data voltage $V_{data\_N}$ using an Nth bias current in order to drive an Nth pixel P_N, an input data voltage may be changed by ΔV to reach the Nth data voltage $V_{data\_N}$ and have an Nth slew rate $SR_N$. The Nth bias current may have an intensity higher than that of the N−1th bias current.

Since the buffer 240 uses bias currents having increasing intensities when the buffer 240 sequentially outputs data voltages for the first pixel P_1 to the second pixel P_2, the first slew rate $SR_1$ and the second slew rate $SR_2$ may be similar to each other. The first data voltage $V_{data\_1}$ supplied to the first pixel P_1 may have a delay shorter than that of the second data voltage $V_{data\_2}$. However, when the first bias current for the first data voltage $V_{data\_1}$ is adjusted to have a low intensity and the second bias current for the second data voltage $V_{data\_2}$ is adjusted to have a high intensity, the first and the second slew rates $SR_1$, $SR_2$ may be similar and a difference between them may be within a predetermined range. That is, the first slew rate $SR_1$ may become a bit lower and the second slew rate $SR_2$ may become a bit higher.

Such a change in a slew rate may be applied to the slew rates regarding the first pixel P_1 to the Nth pixel P_N. When the first bias current to the Nth bias current are changed, the first to the Nth slew rates $SR_1$, $SR_2$, . . . , $SR_{N-1}$, $SR_N$ may be changed accordingly. Differences between the first to Nth slew rates $SR_1$, $SR_2$, . . . , $SR_{N-1}$, $SR_N$ may be within a predetermined range. As the slew rates become similar, a first to an Nth saturation points $SP_1$, $SP_2$, $SP_{N-1}$, $SP_N$ may become similar to each other.

When the buffer 240 drives a plurality pixels P_1, P_2, . . . , P_N−1, P_N by data voltages obtained using differentially adjusted bias currents, respective data voltages may reach required levels within the gate-off point GOP. Generating data voltages using differentially adjusted bias currents may reduce power consumed by the bias currents.

For example, the first data voltage $V_{data\_1}$ for the first pixel P_1 may sufficiently reach within a predetermined time and the buffer 240 may output the first data voltage $V_{data\_1}$ using the first bias current having an intensity relatively low. Since the buffer 240 uses the first bias current having a low intensity, power consumed by the buffer 240 may be reduced. Even though the buffer 240 uses a bias current having a high intensity for the Nth pixel P_N, since the buffer 240 uses bias current having a relatively low intensity for pixels near to the buffer 240, the total power consumption by the buffer 240 may be reduced.

Figure 6:
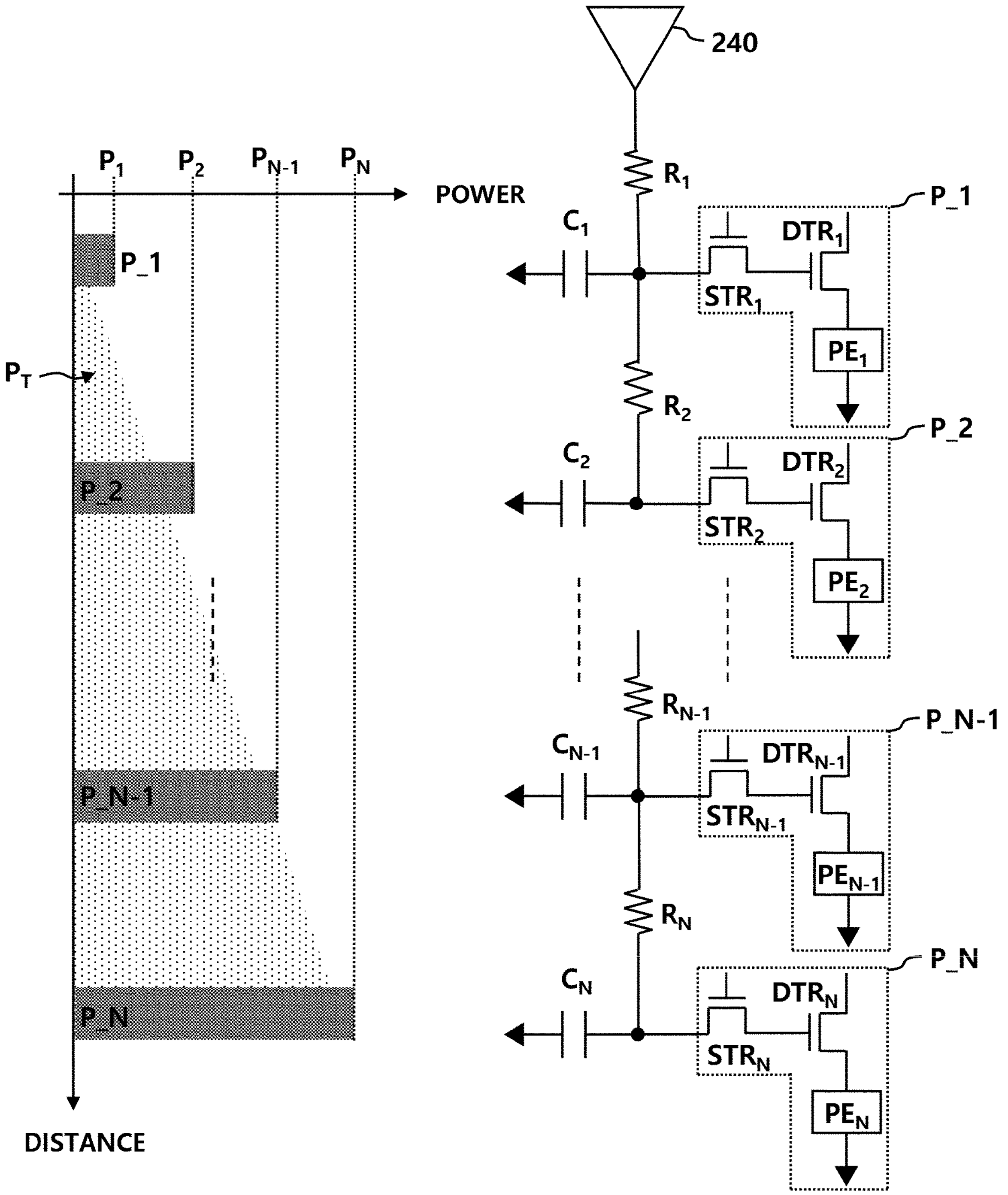
FIG. 6 is a diagram illustrating power consumed by bias current in a plurality of pixels connected with one data line according to an embodiment.

FIG. 6 is a diagram illustrating power consumed by bias current in a plurality of pixels connected with one data line according to an embodiment.

FIG. 6 illustrates a plurality of pixels connected to one data line and power consumption due to bias currents corresponding to the respective pixels. The buffer may output data voltages corresponding to the respective pixels using bias currents having different intensities based on the positions of the respective pixel in the data line. In this way, the buffer 240 may less consume power when driving a pixel near to the source driver and more consume power when driving a pixel far from the source driver.

For example, the power consumed by the buffer 240 due to the bias currents for driving the plurality of pixels P_1, P_2, . . . , P_N−1, P_N may be different depending on the positions of the pixels. Preferably, the power consumed by the buffer 240 may increase as a pixel to be driven is more distanced from the buffer 240. The buffer 240 may consume minimum power when driving the first pixel P_1 positioned nearest to the buffer 240 and consume maximum power when driving the Nth pixel P_N most distanced from the buffer 240.

First power $P_1$ consumed by the buffer 240 due to a bias current in order to drive the first pixel P_1, second power $P_2$ consumed by the buffer 240 due to a bias current in order to drive the second pixel P_2, N−1th power $P_{N-1}$ consumed by the buffer 240 due to a bias current in order to drive the N−1th pixel, and Nth power $P_N$ consumed by the buffer 240 due to a bias current in order to drive the Nth pixel P_N may be different from each other. Here, the first power $P_1$ may be the lowest and the Nth power $P_N$ may be the highest.

Total power $P_T$ consumed by the buffer 240 in one data line due to the bias currents may be identical to a sum of the first power to the Nth power $P_1$, $P_2$, . . . , $P_{N-1}$, $P_N$. In FIG. 6, the total power $P_T$ and the first power to the Nth power $P_1$, $P_2$, . . . , $P_{N-1}$, $P_N$ are illustrated a graph having an axis of power POWER and an axis of distances from the buffer 240 DISTANCE.

As in FIG. 4, when the buffer 240 uses the bias currents having a same intensity in order to output data voltages for the plurality of pixels P_1, P_2, . . . , P_N−1, P_N, the power consumed by the buffer 240 due to the bias currents may increase. When the bias currents having a same intensity are used, the total power $P_T$ may show a rectangle.

On the contrary, as in FIG. 6, when the buffer 240 uses differentially adjusted bias currents in order to output data voltages for the plurality of pixels P_1, P_2, . . . , P_N−1, P_N, the power consumed by the buffer 240 due to the bias currents may decrease. When the bias currents having intensities increasing based on the positions of the pixels are used, the total power $P_T$ may show a right triangle. When comparing areas of the rectangle and the right triangle, it may be noticed that the total power $P_T$ may be reduced to about ½.

Figure 7:
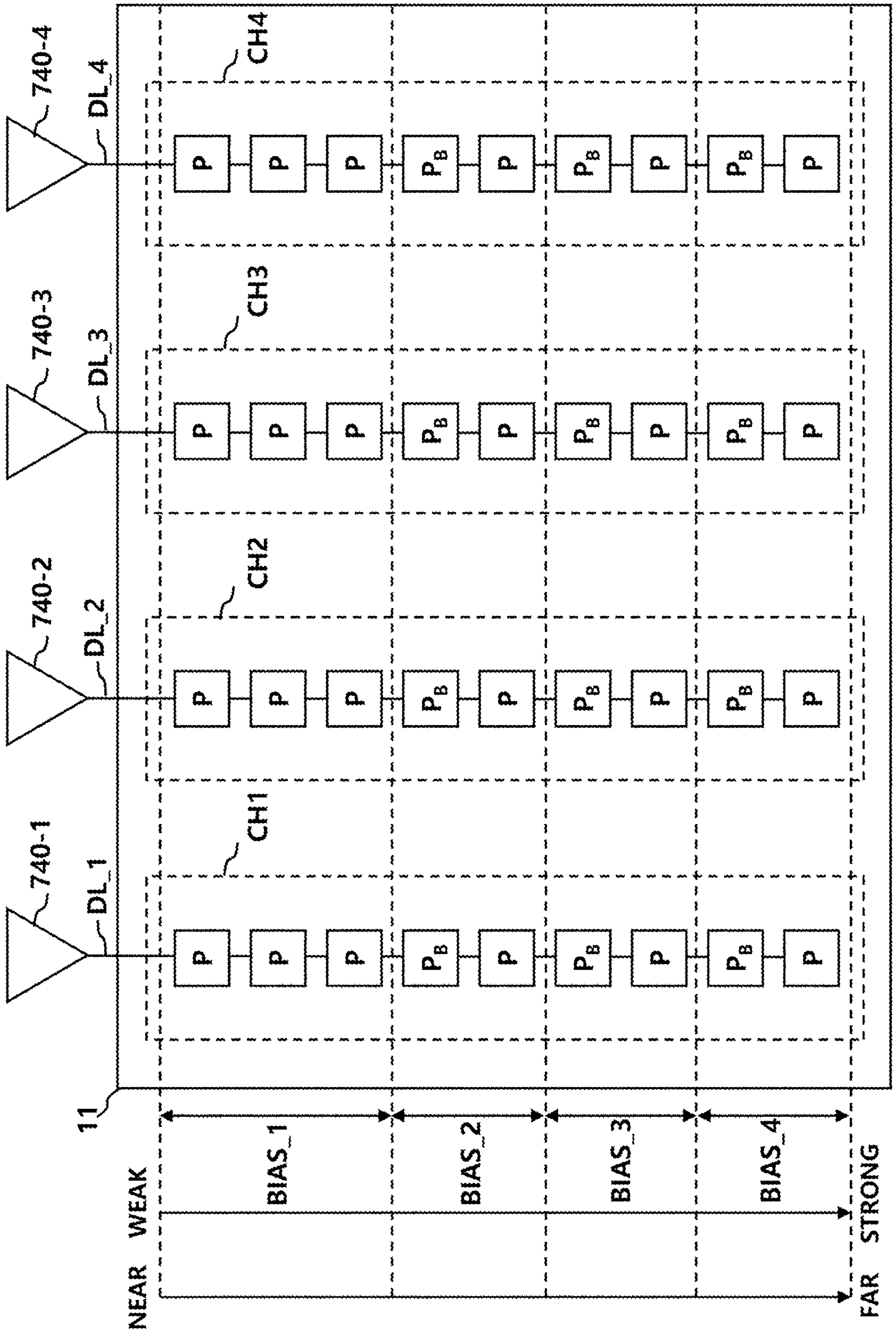
FIG. 7 is a diagram illustrating bias currents that a buffer uses in order to drive a plurality of pixels connected with one data line according to another embodiment.

FIG. 7 is a diagram illustrating bias currents that a buffer uses in order to drive a plurality of pixels connected with one data line according to another embodiment.

Referring to FIG. 7, each of buffers 740-1 to 740-4 of a source driver may output data voltages to a plurality of pixels connected to one data line using bias currents. Here, the buffers 740-1 to 740-4 may divide the plurality of pixels into groups and use different bias currents for respective groups. Each of the buffers 740-1 to 740-4 may use bias currents having a same intensity in order to output data voltages for a plurality of pixels included in one group. In this method as well, the buffers 740-1 to 740-4 may receive bias currents corresponding to the respective pixels from the bias control circuit and output data voltages to the respective pixels using the bias currents. Hereinafter, an example in which each of four buffers 740-1 to 740-4 drives ten pixels connected to one of four data lines $D_{L\_1}$ to $D_{L\_4}$ is described.

Here an area comprising one data line and a plurality of pixels connected to the one data line may be referred to as a channel. The channel may further comprise a buffer in charge of the one data line. In this figure, P may indicate a pixel and CH1 to CH4 may indicate respective channels.

Each of a plurality of pixels may be positioned near to or far from one buffer. A pixel being near to the one buffer may mean a pixel having a short distance to the one buffer and a pixel being far from the one buffer may mean a pixel having a long distance to the one buffer. As a pixel becomes closer to the one buffer, a delay due to resistance elements and capacitance elements becomes short and a slew rate of a data voltage outputted to the pixel becomes relatively high. On the contrary, as a pixel becomes more distanced from the one buffer, a delay due to resistance elements and capacitance elements becomes long and a slew rate of a data voltage outputted to the pixel becomes relatively low. In this figure, a point nearest to the one buffer is indicated by NEAR and a point most distanced from the one buffer is indicated by FAR.

Each of the buffers 740-1 to 740-4 may divide a plurality of pixels connected to one data line into groups and output data voltages using different bias currents for the respective groups.

For example, a first buffer 740-1 may divide ten pixels connected to a first data line $D_{L\_1}$ into four groups. The first buffer 740-1 may include the nearest three pixels in a first group and make a second group to a fourth group such that each includes two pixels based on their positions in the first data line DL_1. The first buffer 740-1 may use a first bias current to a fourth bias current BIAS_1 to BIAS_4 in order to supply data voltages to pixels respectively included in the first group to the fourth group.

Here, the first bias current to the fourth bias current BIAS_1 to BIAS_4 may have different intensities. Preferably, the intensity is higher as the relevant group is more distanced from the buffer. Accordingly, the intensities of the first bias current BIAS_1 to the fourth bias current BIAS_4 may gradually increase. In this figure, the lowest intensity is indicated by WEAK and the highest intensity is indicated by STRONG.

Each of the buffers 740-1 to 740-4 may use a different bias current for each of the groups, but use a bias current having a same intensity for a plurality of pixels included in one group.

For example, when the first buffer 740-1 outputs data voltages for three pixels of the first group, the first buffer 740-1 may use the first bias current BIAS_1. The three pixels in the first group may be driven using a bias current having a same intensity. Based on the positions of the three pixels or their distances from the buffer, the bias current for the three pixels in the first group may have an intensity lower than those for other pixels in the other groups.

As the first buffer 740-1, each of the second buffer to the fourth buffer 740-2 to 740-4 may divide ten pixels connected to each of a second data line to a fourth data line DL_2 to DL_4. Each of the second buffer to the fourth buffer 740-2 to 740-4 may output data voltages using bias currents having different intensities for respective groups. Each of the second buffer to the fourth buffer 740-2 to 740-4 may use bias currents having a same intensity for a plurality of pixels included in one group.

Since a plurality of pixels connected to one data line is divided into groups and driven using bias currents having different intensities, differences between slew rates regarding the pixels may be within a predetermined range. That is, differences between times during which data voltages for the respective pixels are formed may be within a predetermined range.

Here, the differences between the slew rates or the differences between data voltage forming times being within a predetermined range may mean all the data voltages may completely be outputted from a time point when pixels are connected with a data line by scan signals of a turn-on voltage from the gate driver to a time point when the pixels are disconnected from the data line by scan signals of a turn-off voltage (gate-off point).

Meanwhile, a pixel regarding which the intensity of a bias current is changed may be referred to as a boundary pixel. When one buffer outputs data voltages to pixels in one data line by line, a boundary pixel may be driven by a bias current having an intensity different from the intensity of a bias current for a previous pixel. Accordingly, one boundary pixel may be included in each group. For example, a boundary pixel of the second group, which is first driven by a second bias current BIAS_2 in the second group, may be a fourth pixel among ten pixels in the first data line DL_1.

Figure 8:
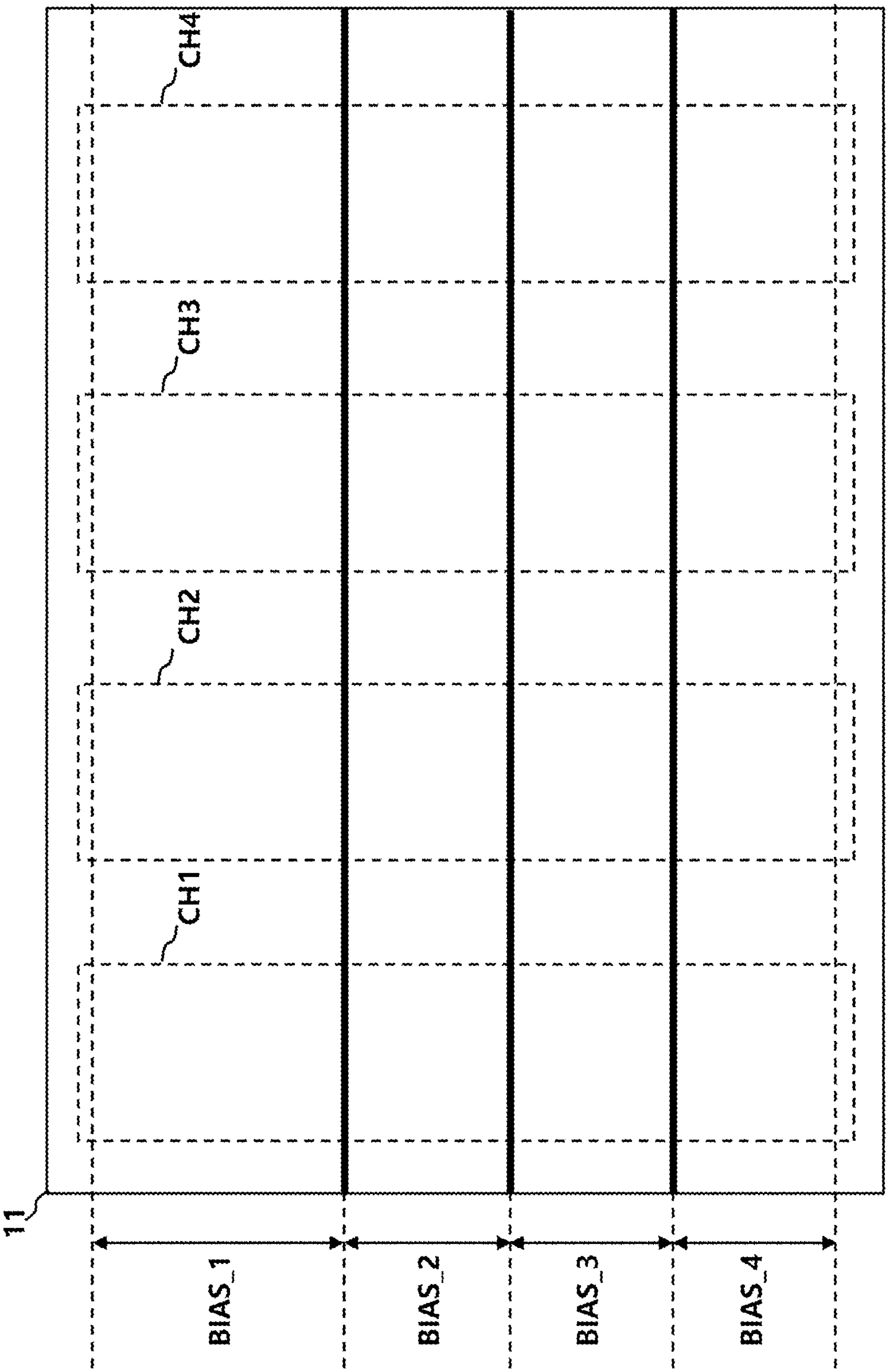
FIG. 8 is a diagram illustrating dim phenomena depending on the setting of bias currents.

FIG. 8 is a diagram illustrating dim phenomena depending on the setting of bias currents.

FIG. 8 illustrates a dim phenomenon occurring when the intensity of a bias current is repeatedly changed at a same position.

In a case when a buffer of the source driver groups a plurality of pixels and uses bias current having different intensities for respective groups, the changes in the intensities of bias current may be repeatedly performed at same positions and these positions may be positions of boundary pixels as described above.

For example, referring to a first channel CH1, a first bias current BIAS_1 may be used for a first group, and then, a second bias current BIAS_2 having an intensity higher than that of the first bias current BIAS_1 may be used for a boundary pixel of a second group. Subsequently, the second bias current BIAS_2 is used for the second group, and then, a third bias current BIAS_3 having an intensity higher than that of the second bias current BIAS_2 may be used for a boundary pixel of a third group. For pixels of a group most distanced from the buffer, a fourth bias current BIAS_4 may be used.

If the positions of boundary pixels, for which bias currents are changed in their intensities, are not changed, in other words, if the positions, for which the settings of bias current intensities are changed, are not changed, a boundary may be formed in or around a boundary pixel. In addition, if such a boundary is maintained in each frame, this boundary may form block-dim. The block-dim may be formed along the boundary pixels all over a panel. In this figure, the block-dim is illustrated as thick solid lines. The block-dim is a representative case of the image degradation. The block-dim needs to be alleviated in addition to the reduction of power consumption of the source driver by maintaining the slew rates to be the same.

Figure 9:
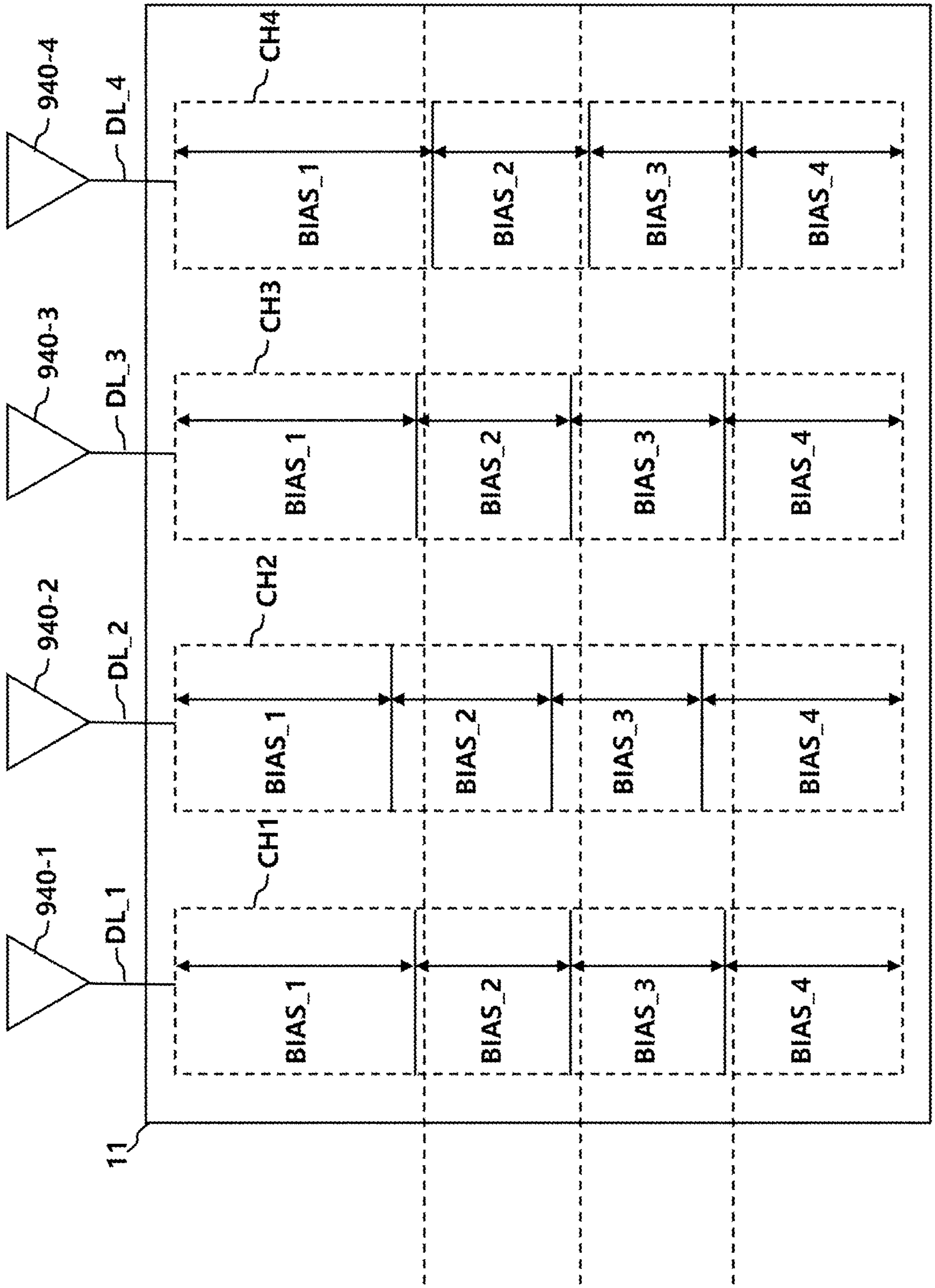
FIG. 9 is a diagram illustrating that a position where a bias current is adjusted is changed in every frame according to still another embodiment.

FIG. 9 is a diagram illustrating that a position where a bias current is adjusted is changed in every frame according to still another embodiment.

FIG. 9 shows alleviation of block-dim while the intensities of bias currents are differentially adjusted in order to maintain the slew rates to be the same according to another embodiment. When the position, for which the setting of a bias current intensity is changed, is changed in every frame, that is, when a boundary pixel is changed in every frame, the block-dim may be alleviated.

The bias control circuit may adjust bias currents such that a pixel, for which the intensity of a bias current is changed, is changed in every frame. The bias control circuit may generate bias currents for driving pixels and transmit the bias currents to buffers 940-1 to 9404 in every frame and the buffers 940-1 to 940-4 may output data voltages to the pixels using the bias currents. Accordingly, a boundary pixel, for which the intensity of a bias current is changed, may be changed in every frame.

For example, referring to the figure, the bias control circuit may adjust the intensities of bias currents based on dotted lines in a first frame, whereas the bias control circuit may adjust the intensities of bias currents based on solid lines in a second frame.

Specifically, in the first frame, the bias control circuit may generate a second bias current BIAS_2 having an intensity higher than that of a first bias current BIAS_1 and transmit the second bias current BIAS_2 to a first buffer 940-1 for a boundary pixel in a position indicated by a dotted line in the figure. The first buffer 940-1 may output data voltages to a second group including the boundary pixel in the position indicated by a dotted line in the figure using the second bias current BIAS_2. Subsequently, in a second frame, the bias control circuit may generate the second bias current BIAS_2 having an intensity higher than that of the first bias current BIAS_1 and transmit the second bias current BIAS_2 to the first buffer 940-1 for a boundary pixel in a position indicated by a solid line in the figure. The first buffer 940-1 may output data voltages to a second group including the boundary pixel in the position indicated by a solid line in the figure using the second bias current BIAS_2.

Here, boundary pixels may be determined randomly or according to a predetermined rule. Accordingly, the positions where the intensities of bias currents are change may also be changed randomly or according to a predetermined rule in respective frames.

Boundary pixels of channels adjacent to each other may be positioned on a same line. In the second frame for example, a boundary pixel for which the second bias current BIAS_2 starts to be used in the first channel CH1 and a boundary pixel for which the second bias current BIAS_2 starts to be used in a third channel CH3 may be positioned on a same horizontal line. In this figure, boundary pixels of the first channel CH1 and boundary pixels of the third channel CH3 may be positioned on same horizontal lines.

Boundary pixels of channels adjacent to each other may be positioned on different lines. In the second frame for example, a boundary pixel for which the second bias current BIAS_2 starts to be used in the first channel CH1 and a boundary pixel for which the second bias current BIAS_2 starts to be used in a second channel CH2 may be positioned on different horizontal lines. In this figure, boundary pixels of the first channel CH1 and boundary pixels of the second channel CH2 may be positioned on different horizontal lines.

As described above, the positions of boundary pixels, that is, the positions, for which the settings of bias current intensities are changed, may be different in respective frames and in adjacent channels as well. When the positions, for which the setting of bias current intensities are changed, are changed in respective frames, the dim phenomenon may be alleviated in comparison with a case when the positions, for which the settings are changed, are fixed.

Figure 10:
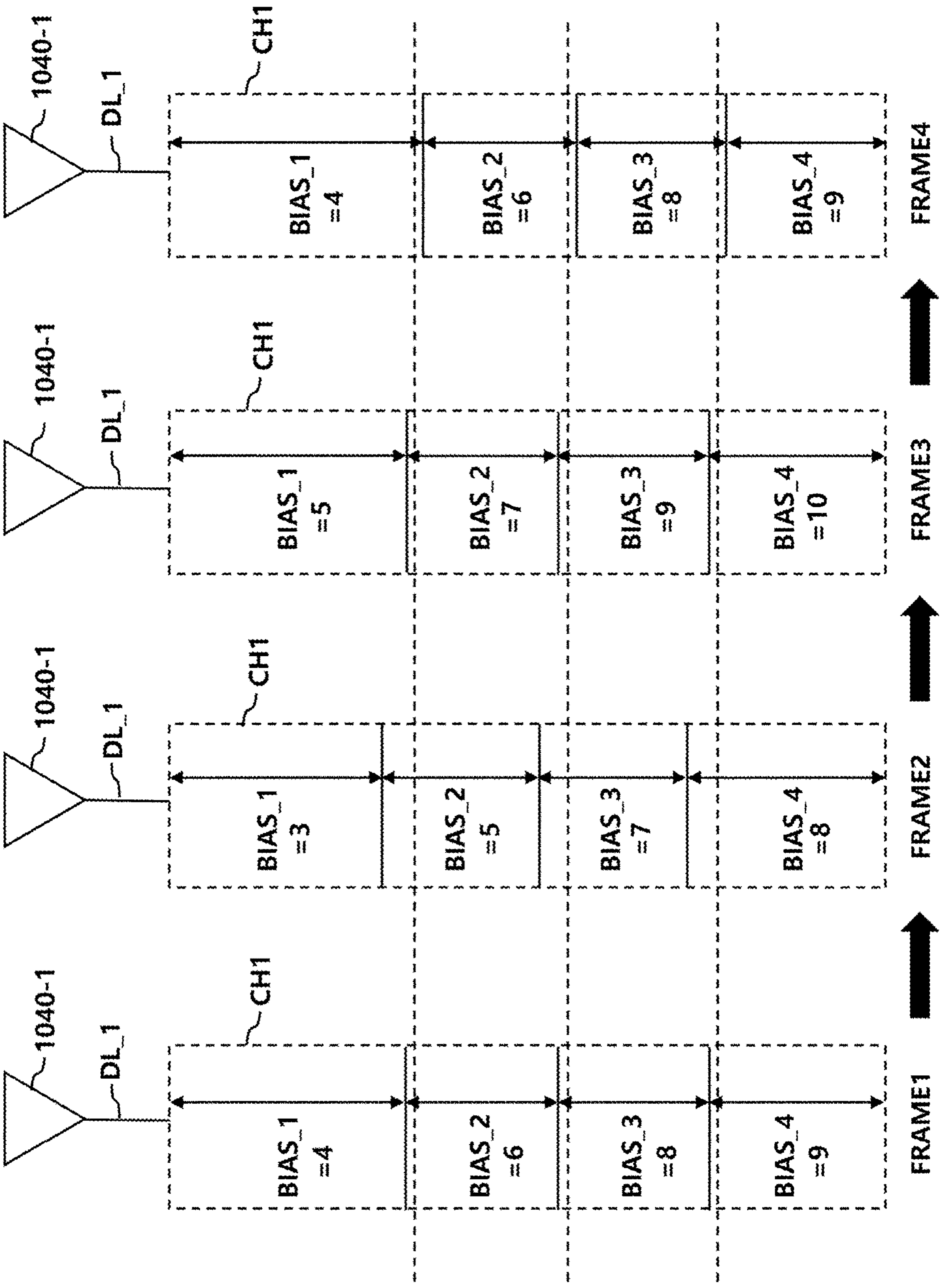
FIG. 10 is a diagram illustrating that a position where a bias current is adjusted is changed in every frame and the intensity of the bias current at the position is also changed in every frame according still another embodiment.

FIG. 10 is a diagram illustrating that a position where a bias current is adjusted is changed in every frame and the intensity of the bias current at the position is also changed in every frame according still another embodiment.

FIG. 10 shows further alleviation of block-dim while the intensities of bias currents are differentially adjusted in order to maintain the slew rates to be the same according to still another embodiment. When the position, for which the setting of a bias current intensity is changed, is changed in every frame, that is, when a boundary pixel is changed in every frame, the block-dim may be alleviated. Further, whenever a boundary pixel is changed in every frame, the intensity of a bias current may also be changed together with the change of a boundary pixel.

The bias control circuit may change a pixel for which the intensity of a bias current is change in every frame and also adjust a bias current to have a different intensity in every frame. The bias control circuit may change a position where a bias current is adjusted and the intensity of a bias current at the position in one channel and may also change a position and an intensity in every frame as well.

For example, a first buffer 1040-1 may change bias currents BIAS_1 to BIAS_4 using certain boundary pixels as points of change and supply data voltages to a first data line DL1 using a first through a fourth bias currents BIAS_1 to BIAS_4 in a first channel CH1. The bias currents may be changed regarding same positions (see dotted lines in the figure) during a first through a fourth frames FRAME1 to FRAME4. However, in this case, a block-dim phenomenon may occur. For this reason, according to another embodiment of the present disclosure, the bias currents may be changed regarding different positions (see solid lines) during the first through the fourth frames FRAME1 to FRAME4. In the first frame FRAME1, bias currents may be changed regarding positions represented a bit higher than the dotted lines in the figure (positions closer to the first buffer 1040-1 in respective groups). In a second frame FRAME2, bias currents may be changed regarding positions represented higher than the positions in the first frame FRAME1. In a third frame FRAME3, bias currents may be changed regarding the same positions as those of the first frame FRAME1. In the fourth frame FRAME4, bias currents may be changed regarding positions represented lower the dotted lines (positions more distanced from the first buffer 1040-1).

Here, positions of one channel, regarding which bias currents are changed, in one frame do not need to be the same as positions in another frame. Even though the positions of the first channel CH1, regarding which bias currents are changed, in the first frame FRAME1 are the same as the position in the third frame FRAME3 in an example described above, the positions of the first channel CH1, regarding which bias currents are changed, may be different in the first through the fourth frames FRAME1 to FRAME4.

In addition, when the positions, regarding which bias currents are changed, are changed, the intensities of the bias currents may also be changed in the first through the fourth frames FRAME1 to FRAME 4. Specifically, in the first frame FRAME1, the bias currents may be changed from a first bias current BIAS_1 to a fourth bias current BIAS_4 regarding the positions described above and the first bias current BIAS_1 to the fourth bias current BIAS_4 may respectively have the intensities of 4, 6, 8, and 9. In the second frame FRAME2, the bias currents may be changed from the first bias current BIAS_1 to the fourth bias current BIAS_4 regarding the positions described above and the first bias current BIAS_1 to the fourth bias current BIAS_4 may respectively have the intensities of 3, 5, 7, and 8. In the third frame FRAME3, the bias currents may be changed from the first bias current BIAS_1 to the fourth bias current BIAS_4 regarding the positions described above and the first bias current BIAS_1 to the fourth bias current BIAS_4 may respectively have the intensities of 5, 7, 9, and 10. In the fourth frame FRAME4, the bias currents may be changed from the first bias current BIAS_1 to the fourth bias current BIAS_4 regarding the positions described above and the first bias current BIAS_1 to the fourth bias current BIAS_4 may respectively have the intensities of 4, 6, 8, and 9. As described above, in transition from the first frame FRAME1 to the second frame FRAME2, the position, regarding which the first bias current BIAS_1 is changed into the second bias current BIAS_2, becomes different and the intensities of the first and the second bias currents BIAS_1, BIAS_2 are also changed from 4, 6 to 3, 5.

The intensities of the first through the fourth bias currents BIAS_1 to BIAS_4 may be variable and randomly set in every frame. However, as a pixel is far from the first buffer 1040-1, the relevant bias current needs to have a high intensity and as a pixel is near to the first buffer 1040-1, the relevant bias current needs to have a low intensity. In this way, times during which data voltages are formed for a plurality of pixels in one data line may be identical. In other words, slew rates for the plurality of pixels may be identical. Even though the intensities of bias currents are randomly changed in respective frames, this matter must be kept.

As described above, the bias control circuit may change positions (boundary pixels) in a channel, regarding which bias currents are changed and intensities of bias currents regarding the positions in every frame. Changing the positions regarding which bias currents are changed and intensities of bias currents regarding the positions in every frame allow a flexible bias current control and this allows reducing power consumption due to the bias currents.

Figure 11:
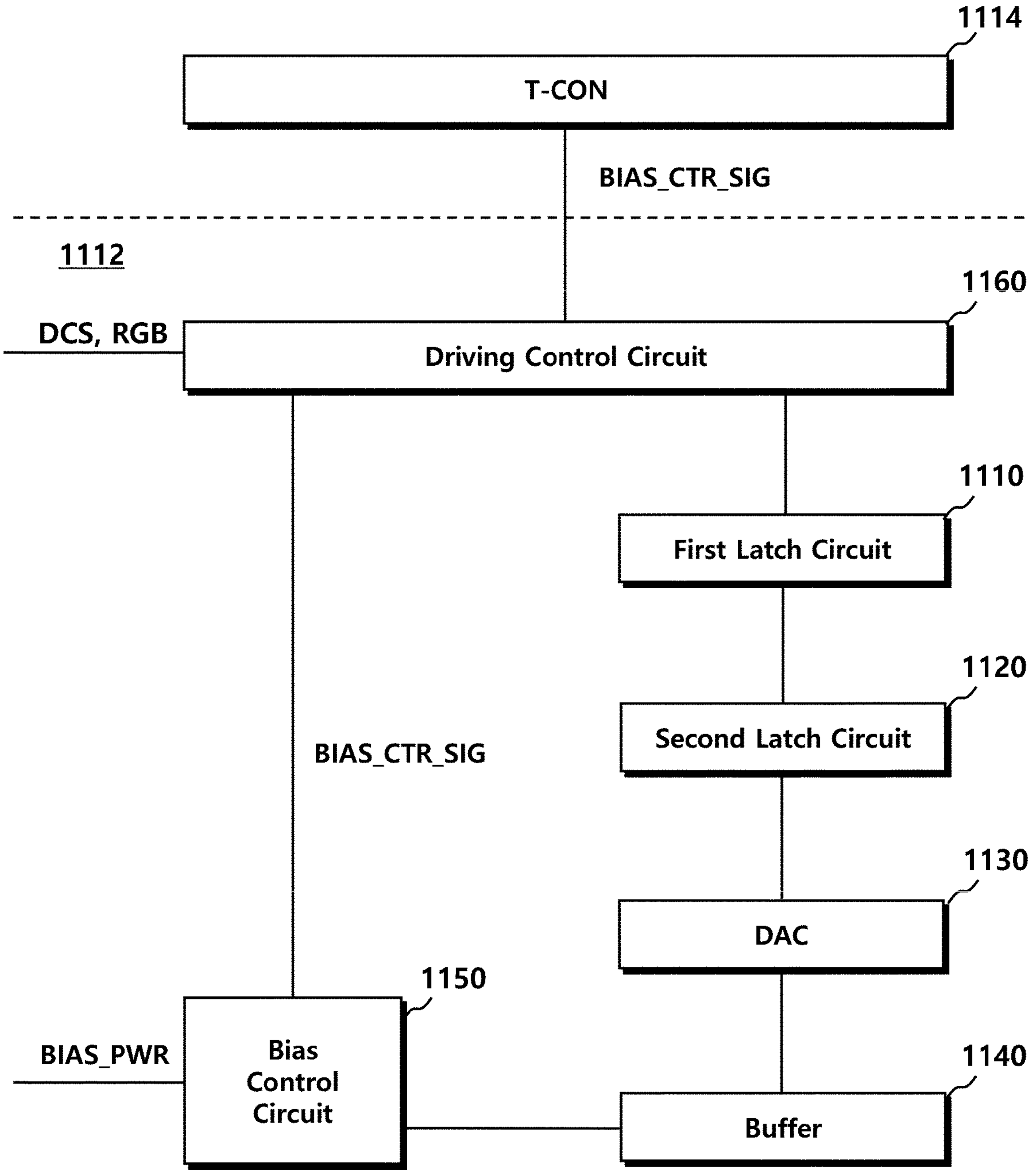
FIG. 11 is a diagram illustrating generation and transmission/reception of a bias control signal according to still another embodiment.

FIG. 11 is a diagram illustrating generation and transmission/reception of a bias control signal according to still another embodiment.

FIG. 11 illustrates another embodiment in which a bias control signal BIAS_CTR-SIG may be generated by a timing controller 1114 and received by a source driver 1112.

The source driver 1112 may comprise a first latch circuit 1110, a second latch circuit 1120, a digital-analog converter DAC 1130, a buffer 1140, a bias control circuit 1150, and a driving control circuit 1160. The source driver 1112 and its sub-components may have the same functions as those of the source driver (12 in FIG. 2) and its sub-components shown in FIG. 2—the first latch circuit (210 in FIG. 2), the second latch circuit (220 in FIG. 2), the DAC (230 in FIG. 2), the buffer (240 in FIG. 2), the bias control circuit (250 in FIG. 2), and the driving control circuit (260 in FIG. 2). Accordingly, the bias control circuit 1150 may receive a bias control signal BIAS_CTR_SIG including position data of each pixel regarding which a bias current is adjusted or timing data prescribing a timing when the intensity of the bias current is adjusted.

Here, the bias control circuit 1150 may receive a bias control signal BIAS_CTR_SIG including intensity data of bias currents. Referring to FIG. 9, the intensity data of bias currents may include intensity values of bias currents changed in one channel. Referring to FIG. 10, the intensity data of bias currents may include intensity values of bias currents changed in one channel and in every frame. In the example described above, the intensity data of bias currents may include (4, 6, 8, 9), (3, 5, 7, 8), (5, 7, 9, 10), (4, 6, 8, 9) which are intensity values of the first through the fourth bias currents BIAS_1 to BIAS_4 in the first through the fourth frames FRAME1 to FRAME4.

Referring again to FIG. 11, the timing controller 1114 may generate a bias control signal BIAS_CTR_SIG including position data, timing data, and/or intensity data of bias currents and transmit the bias control signal to the driving control circuit 1160. The driving control circuit 1160 may transmit to the bias control circuit 1150 the bias control signal BIAS_CTR_SIG as it is or after having processed it. The bias control circuit 1150 may control bias currents of the buffer 1140 by transmitting the bias control signal BIAS_CTR_SIG to the buffer 1140.

What is claimed is:

1. A source driver comprising:

a buffer configured to output a plurality of data voltages based on bias currents in order to drive a plurality of pixels connected to a data line; and a bias control circuit configured to adjust intensities of the bias currents according to positions of respective pixels connected to the data line, wherein the bias control circuit is configured to:

control intensity of a bias current for a first pixel connected to a first gate line and a first data line such that it is different from i) intensity of a bias current for a second pixel connected to the first gate line and a second data line that is adjacent to the first data line and ii) intensity of a bias current for a third pixel connected to the first gate line and a third data line that is adjacent to the first data line, and control the intensity of the bias current for the first pixel such that the intensity of the bias current for the first pixel in a first frame is different from the intensity of the bias current for the first pixel in second and third frames, wherein the first frame is between the second and third frames.

2. The source driver of claim 1, wherein the bias control circuit is configured to receive a bias control signal, and the bias control signal includes position data indicating a pixel position at which intensity of a bias current for a pixel is changed and timing data indicating a timing of changing the intensity of the bias current for the pixel, which is changed at the pixel position.

3. The source driver of claim 2, wherein the bias control signal includes intensity data of the bias current to be changed based on the position data.

4. The source driver of claim 3, wherein the bias control signal is generated and transmitted by a timing controller.

5. The source driver of claim 1, wherein the plurality of pixels includes a first group of pixels and a second group of pixels, and the bias control circuit is configured to adjust bias currents for the first group of pixels to have a first intensity and bias currents for the second group of pixels to have a second intensity.

6. The source driver of claim 5, wherein a distance between the second group of pixels and the source driver is greater than a distance between the first group of pixels and the source driver, and the bias control circuit is configured to set the second intensity to be higher than the first intensity.

7. The source driver of claim 5, wherein a difference between the length of a time interval during which data voltages for the first group of pixels are formed and the length of a time interval during which data voltages for the second group of pixels are formed is within a predetermined range.

8. The source driver of claim 1, wherein the bias control circuit is configured to adjust a bias current to have a highest intensity for driving a pixel which is most distanced from the source driver and adjust a bias current to have a lowest intensity for driving a pixel which is positioned nearest to the source driver.

9. The source driver of claim 8, wherein a difference between the length of a time interval during which a data voltage for the pixel which is most distanced from the source driver is formed and the length of a time interval during which a data voltage for the pixel which is positioned nearest to the source driver is formed is within a predetermined range.

10. The source driver of claim 1, wherein the bias control circuit is configured to divide the plurality of pixels into a plurality of groups and adjust intensities of bias currents to be different for respective groups, and the bias control circuit is configured to adjust bias currents to have a highest intensity for driving a group of pixels most distanced from the source driver and adjust bias current to have a lowest intensity for driving a group of pixels positioned nearest to the source driver.

11. The source driver of claim 10, wherein a difference between the length of a time interval during which data voltages for the group which is most distanced from the source driver among the plurality of groups are formed and the length of a time interval during which data voltages for the group which is positioned nearest to the source driver among the plurality of groups are formed is within a predetermined range.

12. The source driver of claim 1, wherein the pixel position indicated by the position data is determined randomly or according to a predetermined rule.

13. The source driver of claim 1, wherein the bias control circuit is configured to:

set intensities of bias currents for a first set of pixels connected to the first data line to be a first value, wherein the first set of pixels comprises a first subset of pixels connected to a first set of gate lines and a second subset of pixels connected to a second set of gate lines;

set intensities of bias currents for a second set of pixels connected to the first data line to be a second value that is different from the first value, wherein the second set of pixels comprises a third subset of pixels connected to a third set of gate lines and a fourth subset of pixels connected to a fourth set of gate lines;

set intensities of bias currents for a third set of pixels connected to the second data line to be a third value, wherein the third set of pixels is connected to the first set of gate lines; and set intensities of bias currents for a fourth set of pixels connected to the second data line to be a fourth value that is different from the third value, wherein the fourth set of pixels is connected to the second set of gate lines and the third set of gate lines.

14. The source driver of claim 1, wherein the bias control circuit is configured to:

for a first frame, set intensities of bias currents for a first set of pixels connected to the first data line to be a first value, wherein the first set of pixels comprises a first subset of pixels and a second subset of pixels;

for the first frame, set intensities of bias currents for a second set of pixels connected to the first data line to be a second value that is different from the first value, wherein the second set of pixels comprises a third subset of pixels and a fourth subset of pixels;

for a second frame subsequent to the first frame, adjust intensities of bias currents for the first subset of pixels to be a third value that is different from the first value;

for the second frame subsequent to the first frame, adjust intensities of bias currents for the second subset of pixels and the third subset of pixels to be a fourth value that is different from the third value; and for the second frame subsequent to the first frame, adjust intensities of bias currents for the fourth subset of pixels to be a fifth value that is different from the fourth value that is different from the third value and the fourth value.

15. The source driver of claim 1, wherein adjusting the intensities of the bias currents according to the positions of respective pixels connected to the data line reduces differences between slew rates of the data voltages as compared to when the intensities of the bias currents are not adjusted according to the positions of the respective pixels.

16. A method comprising:

outputting a plurality of data voltages based on bias currents in order to drive a plurality of pixels connected to a data line;

adjusting intensities of the bias currents according to positions of respective pixels connected to the data line, wherein adjusting the intensities of the bias currents comprises:

control intensity of a bias current for a first pixel connected to a first gate line and a first data line such that it is different from i) intensity of a bias current for a second pixel connected to the first gate line and a second data line that is adjacent to the first data line and ii) intensity of a bias current for a third pixel connected to the first gate line and a third data line that is adjacent to the first data line, and control the intensity of the bias current for the first pixel such that the intensity of the bias current for the first pixel in a first frame is different from the intensity of the bias current for the first pixel in second and third frames, wherein the first frame is between the second and third frames.

17. A method comprising:

setting a certain pixel position at which intensity of a bias current for a pixel is changed, wherein the set certain pixel position in a first frame is different from the set certain pixel position in a second frame that is subsequent to the first frame and the set certain pixel position in a first data line is different from the set certain pixel position in a second data line that is adjacent to the first data line;

setting intensity of a bias current for a first pixel disposed at the certain pixel position in the first frame to a first intensity value;

generating a first data voltage based on the bias current having the first intensity value;

outputting the generated first data voltage to a third data line, thereby driving a plurality of pixels connected to the third data line;

changing intensity of a bias current for a second pixel disposed at the certain pixel positions in the second frame to a second intensity value;

generating a second data voltage based on the bias current having the second intensity value; and outputting the generated second data voltage to the third data line, thereby driving the plurality of pixels connected to the third data line, wherein the first and third data lines are the same or different.

* * * * *